United States Patent
Ogawa et al.

(10) Patent No.: US 12,446,579 B2
(45) Date of Patent: *Oct. 21, 2025

(54) METHOD FOR SIMULTANEOUSLY PREVENTING PINK BOLLWORM AND AMERICAN BOLLWORM

(71) Applicant: SHIN-ETSU CHEMICAL CO., LTD., Tokyo (JP)

(72) Inventors: Kinya Ogawa, Tokyo (JP); Kazuomi Sato, Niigata (JP); Nobuaki Ishizawa, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 762 days.

This patent is subject to a terminal disclaimer.

(21) Appl. No.: 17/784,974

(22) PCT Filed: Dec. 18, 2020

(86) PCT No.: PCT/JP2020/047444
§ 371 (c)(1),
(2) Date: Jun. 13, 2022

(87) PCT Pub. No.: WO2021/125325
PCT Pub. Date: Jun. 24, 2021

(65) Prior Publication Data
US 2023/0025931 A1 Jan. 26, 2023

(30) Foreign Application Priority Data
Dec. 20, 2019 (JP) .................. 2019-230468

(51) Int. Cl.
A01N 37/06 (2006.01)
A01N 31/02 (2006.01)
A01N 35/02 (2006.01)
A01P 19/00 (2006.01)

(52) U.S. Cl.
CPC ............. *A01N 37/06* (2013.01); *A01N 31/02* (2013.01); *A01N 35/02* (2013.01); *A01P 19/00* (2021.08)

(58) Field of Classification Search
CPC ........ A01N 31/02; A01N 35/02; A01N 37/06; A01N 37/02; A01N 43/36; A01P 19/00
See application file for complete search history.

(56) References Cited

U.S. PATENT DOCUMENTS

| | | | | | |
|---|---|---|---|---|---|
| 5,532,273 | A | * | 7/1996 | Ogawa | A01N 37/02 424/408 |
| 2006/0057177 | A1 | * | 3/2006 | Hojo | A01N 25/18 424/405 |
| 2014/0308328 | A1 | * | 10/2014 | Saguchi | A01N 31/02 424/84 |

FOREIGN PATENT DOCUMENTS

| | | |
|---|---|---|
| JP | 56-104802 A | 8/1981 |
| JP | 5-3746 A | 1/1993 |
| JP | 6-65007 A | 3/1994 |
| JP | 2006-83088 A | 3/2006 |
| JP | 2013-14585 A | 1/2013 |

OTHER PUBLICATIONS

Zinzuvadiya et al. (Trends in Biosciences 10(25), 5363-5371, 2017) (Year: 2017).*
Sarwar et al. (International Journal of Research in Agriculture and Forestry, vol. 4, Issue 7, 2017, pp. 25-36). (Year: 2017).*
El-Mezayyen et al. (Egypt J Agri. Res, 92, 1, 2014 (91-99). (Year: 2014).*
Fred T. Cooke, Jr., et al. "The Economics of BT Cotton in the Mississippi Delta". Proceedings of the Beltwide Cotton Conference, vol. 1, pp. 175-177, 2001 (3 pages).
International Search Report for International Application No. PCT/JP2020/047444, dated Feb. 4, 2021 (4 pages).
Written Opinion for International Application No. PCT/JP2020/047444, dated Feb. 4, 2021 (4 pages).
D. Lykouressis, et al. "Management of the Pink Bollworm *Pectinophora gossypiella* (Saunders) (Lepidoptera: Gelechiidae) by Mating Disruption in Cotton Fields". Crop Protection, vol. 24, No. 2, pp. 177-183 (2005).
Kinya Ogawa. "Trends and Problems in Pheromone Control Overseas". Agriculture and Gardens, vol. 76, No. 1, pp. 176-182 (2001).
Boguslawski, C., et al. "Studies in Cotton Fields in Egypt on the Effects of Pheromone Mating Disruption on Pectinophora gossypiella (Saund.) (Lep., Gelechiidae), on the Occurrence of Other Arthropods, and on Yields". Journal of Applied Entomology, vol. 125, No. 6, pp. 327-331 (2001).
Kinya Ogawa. "Pest Control by Pheromone Mating Disruption and the Role of Natural Enemies". Journal of Pesticide Science, vol. 25, pp. 456-461 (2000).

(Continued)

*Primary Examiner* — Umamaheswari Ramachandran

(57) ABSTRACT

Method for simultaneously preventing pink bollworm and American bollworm, the method including at least: a step in which cotton seedlings are planted in a field 21-41 days after the date of occurrence of the adult stage of the pink bollworm in the case of the first generation, and 1-29 days after the date of occurrence of the adult stage in the case of second and subsequent generations; and a step in which an extended-release pheromone preparation including at least Z,Z/Z,E-7,11-hexadecadienyl acetate, which is a sexual pheromone substance for pink bollworm, and Z-11-hexadecenal, which is a sexual pheromone substance for American bollworm, is implanted in the field 2-15 days before the expected date of occurrence of the adult stage of the next generation of pink bollworm, the expected date derived from the effective integrated temperature, and the sexual pheromone substances in the extended-release pheromone preparation are released in the field.

6 Claims, No Drawings

(56) References Cited

OTHER PUBLICATIONS

International Search Report for International Application No. PCT/JP2020/047438, dated Feb. 2, 2021 (4 pages).
Written Opinion for International Application No. PCT/JP2020/047438, dated Feb. 4, 2021 (4 pages).

* cited by examiner

METHOD FOR SIMULTANEOUSLY PREVENTING PINK BOLLWORM AND AMERICAN BOLLWORM

CROSS-REFERENCE TO RELATED APPLICATIONS

This application is a U.S. National phase filing of international patent application serial number PCT/JP2020/047444, entitled "METHOD FOR SIMULTANEOUSLY PREVENTING PINK BOLLWORM AND AMERICAN BOLLWORM", filed Dec. 18, 2020, which claims priority of Japanese Patent Application No. 2019-230468, filed Dec. 20, 2019. The contents of the above-referenced applications are incorporated herein by reference in their entireties for all purposes.

TECHNICAL FIELD

The invention relates to a method for simultaneously controlling a pink bollworm and a species selected from an American bollworm and its family.

BACKGROUND ART

The main insect pest of cotton in the age when organophosphorus agents were the main control measures was a pink bollworm (scientific name: *Pectinophora gossypiella*; hereinafter also referred to as "PBW"). However, after pyrethroids were developed, they were widely used for the control of many insect pests because of their potent effects and a wide range of the types of targeted insect pests. As a result, secondary insect pests such as an American bollworm (scientific name: *Helicoverpa armigera*; hereinafter also referred to as "ABW"), which had been easily controlled by natural enemies such as egg parasitic bees and larva parasitic bees, emerged and caused trouble in their control. Therefore, the cotton insect pests have been controlled under IPM (Integrated Pest Management) mainly in the United State by using a Bt cotton in which the gene of *Bacillus thuringiensis*, which is an insecticide microorganism, is incorporated into a cotton seed (Non-Patent Document 1).

PRIOR ART DOCUMENT

Non-Patent Document

[Non-Patent Document 1] Proceedings of the Beltwide Cotton Conference Volume 1: 175-177 (2001)

SUMMARY OF THE INVENTION

Problem to be Solved by the Invention

However, when a Bt cotton in which the gene of insecticide microorganism *Bacillus thuringiensis* is incorporated into a cotton seed is used, if the early flower buds, buds or flowers are damaged by larvae hatched from eggs of pink bollworms at the egg-lying sites of the early flower buds, buds or flowers, then the cotton trees lose the motivation to form balls or consume energy for growing leaves, stems and the like. As a result, there is a problem of causing a pheromone called "vegetation" in which the ability to make balls is lowered, the number of balls is decreased, and the yield of cotton is decreased. For example, the yield of cotton was significantly lower under IPM with the Bt cotton in the United States due to the inability to protect early flower buds from insect pests.

In addition, when the Bt cotton is used in a double cropping region and the harvest of the secondary crop overlaps with the time of early cotton buds, etc., a lot of American bollworms may come flying from secondary crop field into the cotton field. For example, in Brazil, China and other countries where the Bt cotton was used, the vegetation did not occur because strong insecticides such as pyrethroids were also used at the same time in order to prevent the damage of early flower buds, but secondary insect pests emerged due to the use of insecticides.

Such a problem is not limited to the cases in which the Bt cotton is used, and can occur with respect to the normal cotton as well.

In recent years, the insect pest control by the mating disruption using a sex pheromone substance has been widely used. However, the sex pheromone substance of the American bollworm is expensive because of the complicated synthesis, and an amount of the sex pheromone substance to be released is 1.5 to 2 times the amount of acetates, so that the control cost becomes high. Accordingly, the control of the pink bollworm and the American bollworm by the mating disruption using the sex pheromone substances has not been put into practical use.

The invention has been made in view of the above circumstances. An object of the invention is to provide a method for simultaneously controlling a cotton bollworm and a species selected from an American bollworm and its family throughout the cotton cultivation period, where the pink bollworm is controlled by disrupting the mating of the pink bollworm through the mating disruption method, and the species selected from an American bollworm and its family is controlled by using a sex pheromone substance particularly in the early period in which the species selected from an American bollworm and its family comes flying from the field of the secondary crop into the cotton field, and by a natural enemy thereafter.

Solution to the Problem

As a result of intensive investigation to achieve the above object, the inventors have reached a method for simultaneously controlling a pink bollworm and a species selected from an American bollworm and its family throughout the cotton cultivation period, where the damages to flower buds, buds or flowers and the damage to balls by pink bollworms and species selected from an American bollworm and its family are suppressed by selecting the time of planting cotton seedlings and the installation time of the sustained release pheromone preparations based on the emergence time of adult pink bollworm; and by controlling the species selected from an American bollworm and its family using a sex pheromone substance particularly in the early period in which the species selected from an American bollworm and its family come flying from the field of the secondary crop into the cotton field, and thereafter using a natural enemy.

In an aspect of the invention, there is provided a method for simultaneously controlling a pink bollworm and a species selected from an American bollworm and its family comprising steps of:

planting a cotton seedling in a field during a period of from 21 days to 41 days after an emergence date of the first-generation adult pink bollworm or during a period of from 1 day to 29 days after an emergence date of the second or latter generation adult pink bollworm; and installing a sustained release pheromone preparation comprising Z,Z/Z,E-hexadecadienyl acetate and Z-11-hexadecenal, which are sex pheromone substances of the pink bollworm and the species selected from an American bollworm and its family, respectively, in the field during a period of from 2 days to 15 days before a predicted emergence date of the next-generation adult pink bollworm, the predicted emergence date being derived from accumulated degree dates, to release the Z,Z/Z,E-hexadecadienyl acetate and the Z-11-hexadecenal into the field.

Effect of the Invention

According to the invention, the yield of cotton is increased by suppressing the damage to early flower buds and the like and the damage to the balls over the entire period by the pink bollworms and the species selected from an American bollworm and its family. Especially, since it is possible to effectively control the species selected from an American bollworm and its family coming flying from the field of the back cultivation into the cotton field, it is possible to control both insect pests of the pink bollworm and the species selected from an American bollworm and its family throughout the cultivation period of cotton.

MODE FOR CARRYING OUT THE INVENTION

In the method for controlling the pink bollworm and the species selected from an American bollworm and its family, the timing of planting a cotton seedling in the field is variable depending on whether the emerging adult pink bollworm is of the first generation or the second or later generation. The generation of insect pests emerging several times a year is determined in accordance with the method defined by the Japanese Society of Applied Entomology & Zoology, and the generations of wintering generation descendants appearing within the year are called, for example, the first generation and the second generation with ordinal numbers.

The pink bollworm to be controlled is preferably of the second or later generation, more preferably the third or fourth generation. The first-generation pink bollworms have been called the suicide generation so that the pink bollworms to be controlled have been conventionally of the second or later generation. In South Asia such as India and Pakistan, where temperatures in early spring are high, agricultural water cannot be secured because of low rainfall during the period when the first-generation adult pink bollworms emerge; so that cotton seedlings cannot be planted in many cases. Therefore, it is difficult to control the first-generation adult pink bollworms.

When the second-generation adult pink bollworms are targeted, cotton seedlings will be planted during the period of from 21 days to 41 days, preferably during the period of from 20 days to 30 days after the emergence date of the first-generation adult pink bollworm. By planting the cotton seedlings during the period of from 21 days to 41 days after the emergence date of the first-generation adult pink bollworm, the formation of early flower buds and the like can be prevented during the period when the first-generation adult pink bollworms emerge at the low temperature. In addition, when the second-generation adult pink bollworms are targeted for control, the problem of water shortage can be solved because there are reservoirs in many of the double cropping areas.

Thus, when the adult pink bollworms are of the first generation, the cotton seedlings are planted during a period of from 21 days to 41 days after the emergence date of the first-generation adult pink bollworm.

When the third or later generation adult pink bollworms are targeted, cotton seedlings will be planted during the period of from 1 day to 29 days (i.e., the period of no less than 1 day to 29 days), preferably during the period of from 1 day to 20 days after the emergence date of the second or later generation adult pink bollworm. When the cotton seedlings are planted less than one day after the emergence date of adult pink bollworm, the early flower buds, etc. are formed at the emergence time of the same generation adult pink bollworm or at the flying time of the species selected from an American bollworm and its family. Accordingly, the early flower buds, etc. are damaged. When the cotton seedlings are planted more than 29 days after the emergence of adult pink bollworms, the cotton trees will be still small so that it is difficult to install the sustained release pheromone preparations before the next-generation adult pink bollworms emerge. By adjusting the timing of planting the cotton seedlings in such a manner as to allow the early cotton buds to come out during the period when the adult bollworms do not emerge, the damage to the cotton buds and the like can be suppressed. Consequently, the cotton trees do not lose the motivation to form balls, and the energy is used for the growth of balls, so that the reduction in the number of balls and the reduction in the yield of the cotton can be suppressed.

The emergence date of adult pink bollworm is determined to be the date at which the adult pink bollworm is captured in the trap. More specifically, one or two traps are installed, prior to the emergence of adult pink bollworm, in the field where cotton seedlings will be planted, and the date at which an adult pink bollworm is captured is determined to be the emergence date of adult pink bollworm. Although most of the traps on the market can be used, a delta trap is preferred from the viewpoint of stability. The installation height of the trap is preferably 20 to 70 cm above the ground, depending on the height of the cotton tree.

The installation time of the sustained release pheromone preparation is from 2 days to 15 days, preferably from 2 days to 10 days before the predicted emergence day of the next-generation adult pink bollworm, where the predicted emergence date is derived from the accumulated degree days. For example, when the emerging adult pink bollworm is of the first generation, an adult pink bollworm whose emergence date is predicted is of the second generation; and when the emerging adult pink bollworm is of the second generation, an adult pink bollworm whose emergence date is predicted is of the third generation. The reason why the installation time of the sustained release pheromone preparation is based on the predicted emergence date of the next-generation adult pink bollworm is that the pink bollworms can mate when the preparations are installed after the emergence of the pink bollworm. Thus, the sustained release pheromone preparation cannot work effectively. In addition, when the installation time of the sustained release pheromone preparation is earlier than 15 days before the predicted emergence date of the next-generation adult pink bollworm, it becomes difficult to install the sustained release pheromone preparation due to the small cotton tree. When the installation time is later than 2 days before the predicted emergence date of the next-generation adult pink bollworm, mating of the next-generation adult pink bollworm cannot be prevented so that the pink bollworm cannot be controlled.

It is preferable to install the sustained release pheromone preparation as early as possible when the American bollworms come flying from the surrounding field during the harvest earlier than the emergence date of the next-generation pink bollworm.

The predicted emergence date of the next-generation adult pink bollworm is derived from the accumulated degree days (hereinafter also referred to as "ADD") of the pink bollworm. For example, in the western region of the United States, the daily average temperature (° F.) is measured from February 1 in a field where emergence of the next-generation adult pink bollworm is expected, and a value obtained by subtracting the developmental zero point 57° F., which is a minimum limit point of the temperature required for development of the pink bollworm, from the daily average temperature, is used as the base temperature for ADD of the day, and the daily base temperatures are accumulated. When the average temperature of the day is lower than the developmental zero, the base temperature of the day is determined to be 0° F. It is reported that when the ADD reaches 408° F., the first-generation pink bollworm (PBW) emerges; when the ADD reaches 918° F., the first-generation PBW reaches the peak; when the ADD reaches 1825° F., the first-generation PBW ends; the ADD from the end of the first-generation adult PBW to the emergence of the next-generation adult PBW is 800° F.; and the ADD from the emergence of the next-generation adult PBW to the end of the next-generation adult PBW is 886° F. (see the University of California Press "Integrated Pest Management for Cotton in the Western Region of the United States Second Edition").

Based on the above information or the ADD obtained in advance with respect to the emergence and end of the pink bollworm in the region where cotton cultivation was actually carried out in the year or years before the relevant year, the emergence date of the next-generation adult pink bollworm is predicted by correcting the ADD as necessary. For example, it is possible to estimate the emergence date of each generation pink bollworm in the western region of the United States as follows.

TABLE 1

|  | ADD (° F.) | increment of ADD (° F.) |
| --- | --- | --- |
| emergence date of the first generation | 408 | 1417 |
| end date of the first generation | 1825 | 800 |
| emergence date of the second generation | 2625 | 886 |
| end date of the second generation | 3511 | 850 |
| emergence date of the third generation | 4361 | 849 |
| end date of the third generation | 5210 | 800 |
| emergence date of the fourth generation | 6010 |  |

Since the ADD is affected by the lowest and highest daily temperatures depending on a region, it is desirable to confirm the ADD in the region where the sustained release pheromone preparations will be used.

In addition, if a trap is installed in the field 10 days before the predicted emergence day of adult pink bollworm to check the error in the ADD obtained in the year or years before the relevant year, then the predicted emergence day of the next-generation adult pink bollworm can be estimated with higher accuracy.

Regarding the species selected from an American bollworm and its family, which is another target for the control, the flower buds may be kept undamaged by the species selected from an American bollworm and its family coming flying from a field around the cotton field into the cotton field during the early flower bud formation of cotton. Usually, when the density of species selected from an American bollworm and its family is low, the possibility of the damages by the species selected from an American bollworm and its family in the early flower bud period is low. However, for example, when a field of corns or beans which have reached the harvest period is located around the cotton field, there are many cases in which species selected from an American bollworm and its family having lost their habitats come flying from the field of corns or beans into the cotton field. For this reason, in the invention, in order to prevent damage during this period, sustained release pheromone preparations containing a sex pheromone substance of the species selected from an American bollworm and its family are installed in the cotton field only during this period. After that, the American bollworm can be controlled by a gradually growing natural enemy such as bees parasitic on eggs or larvae of the species selected from an American bollworm and its family.

Thus, by suppressing the damages by pink bollworms and species selected from an American bollworm and its family during the early flower bud formation of cotton, the ability to make cotton balls is not reduced, the number of balls is increased, and as a result, the yield of cotton is also increased.

A sustained release pheromone preparation to be used for simultaneously controlling a pink bollworm and a species selected from an American bollworm and its family comprises Z,Z/Z,E-7,11-hexadecadienyl acetate, which is a sex pheromone substance of the pink bollworm; and Z-11-hexadecenal, which is a sex pheromone substance of the species selected from an American bollworm and its family; and a polymer container having the Z,Z/Z,E-7,11-hexadecadienyl acetate and the Z-11-hexadecenal enclosed therein.

Examples of the sex pheromone substance include Z,Z/Z,E-7,11-hexadecadienyl acetate, which is a sex pheromone substance of pink bollworm.

In addition, it is preferable to use a mixture of Z,Z/Z,E-7,11-hexadecadienyl acetate and Z,Z/Z,E-7,11-hexadecadienol from the viewpoint of preventing the decrease in the mating disruption effect when the pink bollworms are present at a high density. The mass ratio of Z,Z/Z,E-7,11-hexadecadienyl acetate to Z,Z/Z,E-7,11-hexadecadienol is preferably from 99.5:0.5 to 95.0:5.0, more preferably from 99.0:1.0 to 96.0:4.0, and still more preferably from 98.5:1.5 to 96.5:3.5

On the other hand, examples of the sex pheromone substance of the species selected from an American bollworm and its family include Z-11-hexadecenal, which is a common sex pheromone substance of the species selected from an American bollworm and its family. Examples of the species selected from an American bollworm and its family includes the following insect pests, each of which contains Z-11-hexadecenal, which is a common sex pheromone substance of the species selected from an American bollworm and its family, as a main component (a component having a maximum content in a natural sex pheromone composition) or the second component. The species selected from an American bollworm and its family may contain the other sex pheromone substance or substances. The following insect pests are listed together with sex pheromone substances. The species selected from an American bollworm and its family is preferably an insect pest (a species) of genera *Heliothis* and *Helicoverpahe*. When the main component of the sex pheromone substances of the species selected from an American bollworm and its family is Z-9-hexadecenal, the sustained release preparation preferably contains Z-9-hexadecenal in addition to the Z-11-hexadecenal.

American bollworm (scientific name: *Heliothis armigera*)
  Z-11-hexadecenal,
  Z-9-hexadecenal,
  Z-11-tetradecenal
corn eatworm (scientific name: *Helicoverpa zea*)
  Z-11-hexadecenal,
  Z-9-hexadecenal
oriental tobacco budworm (scientific name: *Helicoverpa assulta*)
  Z-11-hexadecenal,
  Z-9-hexadecenal
scientific name: *Heliothis punctiger*
  Z-11-hexadecenal,
  Z-11-hexadecenyl acetate
tobacco budworm (scientific name: *Heliothis virescens*)
  Z-11-hexadecenal,
  Z-11-tetradecenal Regarding the sex pheromone substance of the species selected from an American bollworm and its family, it is preferable to use a mixture of Z-11-hexadecenal and Z-11-hexadecenol from the viewpoint of preventing the decrease in the mating disruption effect when the species selected from an American bollworm and its family are present at a high density. The mass ratio of Z-11-hexadecenal to Z-11-hexadecenol is preferably from 99.0:1.0 to 92.0:8.0, more preferably from 98.5:1.5 to 94.0:6.0, and still more preferably from 98.0:2.0 to 95.0:5.0.

The sustained release pheromone preparation may comprise, in addition to the sex pheromone substances, an optional additive such as an antioxidant and an ultraviolet absorber, depending on the degree of stability of the sex pheromone substances.

Examples of the antioxidant include synthetic antioxidants such as BHT (butylhydroxytoluene), BHA (butylhydroxyanisole), ethyl protocatechuate, isoamyl gallate, and propyl gallate; and natural antioxidants such as NDGA (nordihydroguaiaretic acid) and gum guaiac.

Examples of the ultraviolet absorber include para-aminobenzoic acid-based derivatives such as octyl 4-(dimethylamino)benzoate; benzophenone derivatives such as oxybenzone (i.e., 2-hydroxy-4-methoxybenzophenone), and 2-hydroxy-4-octoxybenzophenone; methoxycinnamic acid derivatives; and salicylic acid derivatives.

Each content of the antioxidant and the ultraviolet absorber is preferably from 0.01 to 5% by mass, and the total content of the antioxidant and the ultraviolet absorber is preferably from 0.02 to 10% by mass.

As a material of the polymer container, a polyolefin-based polymer is preferred. Examples of the polyolefin-based polymer include polyolefins such as polyethylene and polypropylene; and ethylene-vinyl acetate copolymers. The polymer material allows sex pheromone substances or the like to permeate through the polymer material and be released outside the polymer membrane at appropriate rates. As a material of the polymer container, biodegradable polyesters and polyvinyl chloride can also be used.

Examples of the shape of the polymer container include a tube and a bag. The tube is preferable from the viewpoint of a prolonged period of releasing a sex pheromone substance and uniform release. The sex pheromone substance of the pink bollworm, the sex pheromone substance of the species selected from an American bollworm and its family, and an optional additive to be added to each sex pheromone substance may be placed together in the same chamber or in separate chambers. The sex pheromone substances are placed preferably in respective separate chambers from the viewpoint of more uniform release over a longer period of time. For example, a tubular preparation may be used in which a polymer tube having Z,Z/Z,E-7,11-hexadecadienyl acetate, which is a sex pheromone substance of pink bollworm, enclosed therein, and a polymer tube having Z-11-hexadecenal, which is a common sex pheromone substance of the species selected from an American bollworm and its family, enclosed therein, are arranged in parallel and their both ends are heated and melted together into an integrated body.

When the polymer container is in the form of tube, the inner diameter of the tube is variable depending on the amount of the sex pheromone substance enclosed therein. The inner diameter of a polymer tube having the sex pheromone of the pink bollworm enclosed therein is preferably from 0.6 to 1.8 mm, more preferably from 0.9 to 1.5 mm, and the inner diameter of a polymer tube having the sex pheromone substance of the species selected from an American bollworm and its family is preferably from 0.4 to 1.2 mm, more preferably from 0.5 to 1.0 mm, from the viewpoint of an appropriate release rate.

The length of the tube is preferably from 10 cm to 1 m, more preferably from 20 to 50 cm.

Regarding the tube thickness, from the viewpoint of an appropriate release rate, the thickness of the polymer tube having the sex pheromone substance of the pink bollworm enclosed therein is preferably 0.3 to 0.8 mm, more preferably 0.4 to 0.6 mm, and the thickness of the polymer tube having the sex pheromone substance of the species selected from an American bollworm and its family is preferably 0.2 to 0.6 mm, more preferably 0.3 to 0.5 mm.

When the sex pheromone substance of the pink bollworm and the sex pheromone substance of the species selected from an American bollworm and its family are placed in respective separate chambers, the polymer container having the above-mentioned shape has two or more chambers for enclosing the sex pheromone substances, the inner diameter and the wall thickness of each chamber may be different, and each sex pheromone substance may be enclosed in at least one of the chambers.

When a container comprises two or more chambers with each chamber having a sex pheromone substance and an optional additive enclosed therein, the amount of the sex pheromone substances and the optional additive in the container is variable depending on the release period, the volatility of each sex pheromone substance, and the affinity of each sex pheromone substance with the container material and the like. It is preferably 50 to 500 mg per container comprising two or more chambers.

When a container comprises only one chamber in which a sex pheromone substance of pink bollworm, a sex pheromone substance of the species selected from an American bollworm and its family and an optional additive are enclosed, the amount of the sex pheromone substances and the optional additive in the container is variable depending on the release period, the volatility of each sex pheromone substance, and the affinity of each sex pheromone substance with the container material and the like. It is preferably 50 to 500 mg per container comprising only one chamber.

The amount of the sex pheromone substance of the species selected from an American bollworm and its family in the sustained release pheromone preparation is preferably more than 0% by mass and not more than 60% by mass, and more preferably more than 0% by mass and not more than 50% by mass, relative to the amount of the sex pheromone substance of the pink bollworm. The lower limit of the amount of the sex pheromone substance of the species selected from an American bollworm and its family in the sustained release pheromone preparation is not particularly limited, and is preferably 20% by mass, more preferably 30% by mass. The control of the species selected from an American bollworm and its family may be carried out only at the time when the early flower buds etc. are damaged by the many species selected from an American bollworm and its family coming filing from a field around the cotton field. After that, the species selected from an American bollworm and its family may be controlled by the gradually growing natural enemy. Thus, the amount of the expensive sex pheromone substance of the species selected from an American bollworm and its family can be reduced so that the species selected from an American bollworm and its family can be efficiently controlled. Therefore, it is effective to combine a sustained release pheromone preparation of the long-life pink bollworm with a sustained release pheromone preparation of the short-life species selected from an American bollworm and its family.

EXAMPLES

Hereinafter, the invention will be described in detail with reference to Examples and Comparative Examples. However, it should not be construed that the invention is limited to or by Examples.

<Production of Sustained Release Pheromone Preparation>

Z,Z/Z,E-7,11-Hexadecadienyl acetate and Z,Z/Z,E-7,11-hexadecadienol were mixed in a mass ratio of 98.2:1.8 to obtain a mixed liquid 1. The mixed liquid 1 was subjected to addition of 2% by mass of butylhydroxytoluene and 2% by mass of 2-hydroxy-4-octoxybenzophenone as an antioxidant and an ultraviolet absorber, respectively, relative to the mass of the mixed liquid 1 to prepare a pheromone solution 1 for the pink bollworm.

A mixed liquid 2 was obtained by mixing Z-11-hexadecenal and Z-11-hexadecenol in a mass ratio of 95.2:4.8. A mixed liquid 3 was obtained by mixing Z-11-hexadecenal, Z-11-hexadecenol, Z9-hexadecenal and Z11-tetradecenal in a mass ratio of 82.5:4.1:5.2:8.2. Each of the mixed liquids 2 and 3 was subjected to addition of 2% by mass of butylhydroxytoluene and 2% by mass of 2-hydroxy-4-octoxybenzophenone as an antioxidant and an ultraviolet absorber, respectively, relative to each mass of the mixed liquids 2 and 3 to prepare pheromone solutions 2 and 3 for the American bollworm.

Then, 161 mg of the pheromone solution 1 was placed in a 20 cm polyethylene tube having an inner diameter of 1.1 mm and a wall thickness of 0.6 mm; 82 mg of the pheromone solution 2 was placed in a 20 cm polyethylene tube having an inner diameter of 0.8 mm and a wall thickness of 0.4 mm; and both ends of the two tubes were heat-sealed together to form a sustained release pheromone preparation 1.

Similarly, 161 mg of pheromone solution 1 was placed in a 20 cm polyethylene tube having an inner diameter of 1.1 mm and a wall thickness of 0.6 mm; 82 mg of pheromone solution 3 was placed in a 20 cm polyethylene tube having an inner diameter of 0.8 mm and a wall thickness of 0.4 mm; and both ends of the two tubes were heat-sealed together to form a sustained release pheromone preparation 2.

Further, 161 mg of the pheromone solution 1 was placed in a 20 cm polyethylene tube having an inner diameter of 1.1 mm and a wall thickness of 0.6 mm; 81 mg of the pheromone solution 1 and 81 mg of the pheromone solution 2 were placed in a 20 cm polyethylene tube having an inner diameter of 1.1 mm and a wall thickness of 0.4 mm; and both ends of the two tubes were heat-sealed together to form a sustained release pheromone preparation 3.

<Damage to Flowers>

One hundred flowers in each lot were observed every week from the fifth week after planting of cotton seedlings. A flower containing a pink bollworm larva or an American bollworm larva, or having the color darkened, or a withered flower was rated as "damaged", while a flower having the color of yellow white or pink was rated as "not damaged".

And, the average value of the damage to flowers until the ninth week after planting the cotton seedlings was regarded as the damages in the first half, while the average value of the damage to flowers from the tenth week to the fourteenth week after planting the cotton seedlings was regarded as the damages in the second half.

<Damage to Balls>

Fifty young balls were collected every week from the eleventh week to the fifteenth week after planting the cotton seedlings, and kept in a box at 30° C. and 70% humidity for two weeks. Then the balls were split for observation. A ball containing the pink bollworm larva changed to red was rated as "damaged".

<Percentage of Good Quality Products>

Fifty open cottonseeds were collected in each lot at 14 weeks, 19 weeks and 25 weeks after planting the cotton seedlings. The white cotton without being colored was rated as "good quality products", while the cotton colored from black to yellow was rated as "poor quality products". The percentage of good quality products was obtained as the ratio of the number of good quality products to the total number of collected cottonseeds.

Examples 1-1, 1-2 and Comparative Example 1

A field having a length of 1200 m from northwest to southeast and a length of 300 m from southwest to northeast was divided from northwest to southeast into three lots, which were assigned from the northwest to southeast as Lot A1 (Example 1-1), Lot B1 (Example 1-2), and Lot C1 (Comparative Example 1), respectively. Each lot had an area of 12 hectares. In each lot, Bt cotton seedlings were planted one day after the emergence of the second-generation pink bollworm (PBW).

Thereafter, 400 sustained release pheromone preparations 1 per hectare were installed in Lot A1 ten days before the predicted date of the third-generation adult PBW, and 400 sustained release pheromone preparations 1 per hectare were installed in Lot B1 five days before the predicted date of the third-generation adult PBW, each predicted date being derived from the accumulated degree days. No sustained release pheromone preparation was installed in Lot C1 of Comparative Example.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings.

The damage to flowers, the yield of cotton, and the percentage of good quality products were determined in each lot. The results are shown in Table 2.

TABLE 2

|  | lot | damage to flowers first half (%) | damage to flowers second half (%) | damage to balls (%) | yield of cotton (t/ha) | percentage of good quality products (%) |
|---|---|---|---|---|---|---|
| Example 1-1 | A1 | 0.0 | 0.0 | 10.8 | 5.6 | 95.2 |
| Example 1-2 | B1 | 0.1 | 0.2 | 11.2 | 5.4 | 93.3 |
| Comp. Ex. 1 | C1 | 0.8 | 2.6 | 12.7 | 3.4 | 85.2 |

In each lot of Examples, the damage to flowers and the damage to balls were low and the yield of cotton and the percentage of good quality products were high in comparison with those in the lot of Comparative Example. The damage to flowers was low and the yield of cotton was high in Example 1-1 in which the sustained release pheromone preparation was installed five days earlier than in Example 1-2. It is because the vegetation provides more damage to the flowers in the first half.

Examples 2-1, 2-2, and Comparative Example 2

A field having a length of 1200 m from northwest to southeast and a length of 300 m from southwest to northeast were divided from northwest to southeast into three lots, which were assigned from the northwest to southeast as Lot A2 (Example 2-1), Lot B2 (Example 2-2), and Lot C2 (Comparative Example 1), respectively. Each lot had an area of 12 hectares. In each lot, Bt cotton seedlings were planted eight days after the emergence of the second-generation PBW.

Thereafter, 400 sustained release pheromone preparations 1 per hectare were installed in Lot A2 eight days before the predicted date of the third-generation adult PBW, and 400 sustained release pheromone preparations 2 per hectare were installed in Lot B2 eight days before the predicted date of the third-generation adult PBW, each predicted date being derived from the accumulated degree days. No sustained release pheromone preparation was installed in Lot C2 of Comparative Example.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings.

The damage to flowers, the yield of cotton and the percentage of good quality products were determined in each lot. The results are shown in Table 3.

TABLE 3

|  | lot | damage to flowers first half (%) | damage to flowers second half (%) | damage to balls (%) | yield of cotton (t/ha) | percentage of good quality products (%) |
|---|---|---|---|---|---|---|
| Example 2-1 | A2 | 0.3 | 0.4 | 8.0 | 5.3 | 92.8 |
| Example 2-2 | B2 | 0.2 | 0.2 | 6.7 | 5.4 | 94.6 |
| Comp. Ex. 2 | C2 | 2.6 | 2.8 | 14.3 | 3.1 | 82.3 |

There was a rapeseed harvest in the surrounding agricultural land at the time of the early flower buds of cotton, so that American bollworms in the rapeseed field come fling to the field of cotton because of loss of food (i.e., rapeseed). However, the damage to the flower buds was low and good results were obtained in each lot of Examples in which the sustained release pheromone preparations were installed.

Further, American bollworms come flying from the periphery of the cotton field more into the lot of Example 2-1 than the lot of Example 2-2, so that the damage to flowers and the damage to balls were slightly higher and the yield of cotton was also slightly lower in Example 2-1 than in Example 2-2.

In contrast, into the lot of Comparative Example 2 where no sustained release pheromone preparation was installed, American bollworms come filing at the time of the early flower buds, so that the damage to the flower buds was high, the vetation lowered the ability to form balls, the number of balls was reduced, and the yield of cotton was greatly lowered.

Examples 3-1, 3-2, and Comparative Example 3

A field having a length of 900 m from northwest to southeast and a length of 300 m from southwest to northeast were divided from northwest to southeast into three lots, which were assigned from northwest to southeast as Lot A3 (Example 3-1), Lot B3 (Example 3-2), and Lot C3 (Comparative Example 3). Each lot had an area of 9 hectares. In each lot, Bt cotton seedlings were planted five days after the emergence of the third-generation PBW.

Thereafter, 500 sustained release pheromone preparations 1 per hectare were installed in Lot A3 ten days before the predicted date of the fourth-generation adult PBW, and 500 sustained release pheromone preparations 3 per hectare were installed in Lot B3 ten days before the predicted date of the fourth-generation adult PBW, each predicted date being derived from the accumulated degree days. No sustained release pheromone preparation was installed in Lot C3 of Comparative Example.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings.

The damage to flowers, the yield of cotton and the percentage of good quality products were determined for each lot. The results are shown in Table 4.

TABLE 4

|  | lot | damage to flowers first half (%) | damage to flowers second half (%) | damage to balls (%) | yield of cotton (t/ha) | percentage of good quality products (%) |
|---|---|---|---|---|---|---|
| Example 3-1 | A3 | 0.2 | 1.0 | 8.8 | 4.8 | 88.9 |
| Example 3-2 | B3 | 0.2 | 0.6 | 6.4 | 5.0 | 90.2 |
| Comp. Ex. 3 | C3 | 4.0 | 7.6 | 18.3 | 2.9 | 81.6 |

There was a corn harvest in the surrounding agricultural land at the time of the early flower buds of cotton, so that American bollworms in the corn field come fling to the field of cotton because of loss of food (i.e., corn). In addition, only a small number of American bollworms had been present in the lot of Comparative Example 3 so that the number of natural enemies of American bollworms was small. American bollworm (ABW) larvae emerged and damaged flower buds and the like. The vegetation lowered the ability to form balls, the number of balls was reduced, and the yield of cotton was reduced.

On the other hand, in the lots of Examples 3-1 and 3-2 where the sustained release pheromone preparations were installed, the damage to flowers by ABW was suppressed because the sustained release pheromone preparations contained the sex pheromone substance of ABW, and after that, the control of ABW became possible by the natural enemies. Consequently, the yield of cotton and the percentage of good quality products were high.

In Example 3-2, the sex pheromone substance of PBW was released from two tubes, so that the amount of the sex pheromone substance of PBW increased in the initial stage of installation of the sustained release pheromone preparations, and the density of PBW was low also in the second half. These may be the reasons why the damage by PBW was low in Example 3-2.

The invention claimed is:

1. A method for simultaneously controlling a pink bollworm and a species selected from an American bollworm and its family, the method comprising steps of:
    planting a cotton seedling in a field during a period of from 21 days to 41 days after an emergence date of the first-generation adult pink bollworm or during a period of from 1 day to 29 days after an emergence date of the second or later generation adult pink bollworm; and
    installing a sustained release pheromone preparation comprising Z,Z/Z,E-7,11-hexadecadienyl acetate and Z-11-hexadecenal, which are sex pheromone substances of the pink bollworm and the species selected from an American bollworm and its family, respectively, in the field during a period of from 2 days to 15 days before a predicted emergence date of the next-generation adult pink bollworms, the predicted emergence date being derived from accumulated degree days, to release the Z,Z/Z,E-7,11-hexadecadienyl acetate and the Z-11-hexadecenal into the field.

2. The method for simultaneously controlling a pink bollworm and a species selected from an American bollworm and its family according to claim 1, wherein the emerging adult pink bollworm is of the second generation.

3. The method for simultaneously controlling a pink bollworm and a species selected from an American bollworm and its family according to claim 1, wherein the emerging adult pink bollworm is of the third generation.

4. The method for simultaneously controlling a pink bollworm and a species selected from an American bollworm and its family according to claim 1, wherein an amount of the Z-11-hexadecenal is more than 0% by mass and not more than 60% by mass relative to an amount of the Z,Z/Z,E-7,11-hexadecadienyl acetate.

5. The method for simultaneously controlling a pink bollworm and a species selected from an American bollworm and its family according to claim 1, wherein the sustained release pheromone preparation further comprises Z,Z/Z,E-7,11-hexadecadienol, and a mass ratio of the Z,Z/Z,E-7,11-hexadecadienyl acetate to the Z,Z/Z,E-7,11-hexadecadienol is from 99.5:0.5 to 95.0:5.0.

6. The method for simultaneously controlling a pink bollworm and a species selected from an American bollworm and its family according to claim 1, wherein the sustained release pheromone preparation further comprises Z-11-hexadecenol and a mass ratio of the Z-11-hexadecenal to the Z-11-hexadecenol is from 99.0:1.0 to 92.0:8.0.

* * * * *